(No Model.)
J. C. McCARTHY.
OIL CAN.
No. 553,563.
Patented Jan. 28, 1896.
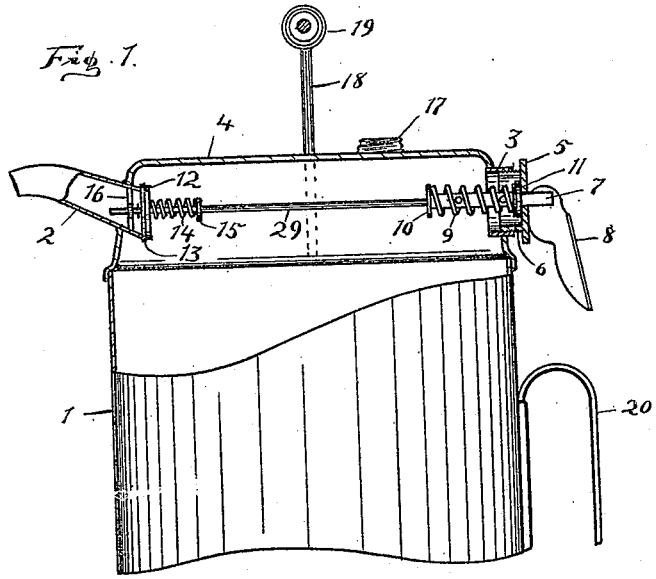
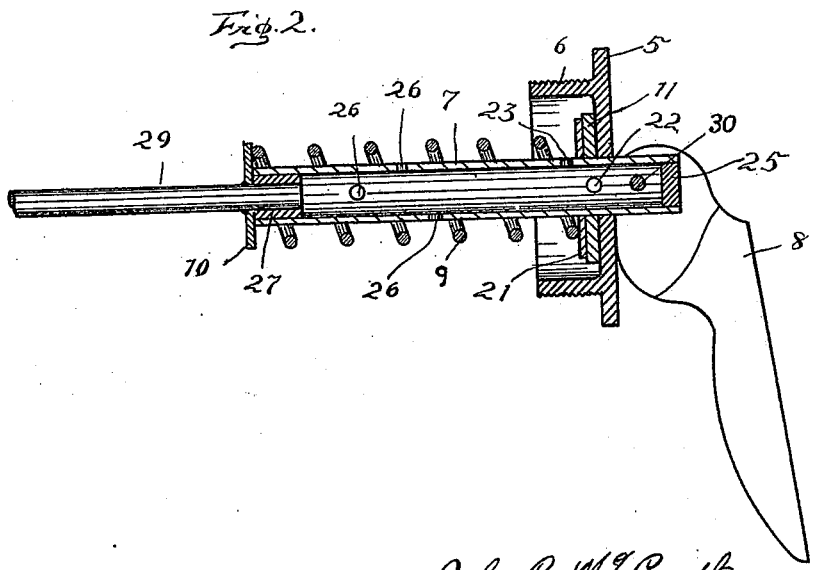
WITNESSES:
John C. McCarthy  INVENTOR
BY Chapin & Denny
his ATTORNEYS.

UNITED STATES PATENT OFFICE.

JOHN C. McCARTHY, OF FORT WAYNE, INDIANA.

OIL-CAN.

SPECIFICATION forming part of Letters Patent No. 553,563, dated January 28, 1896.

Application filed April 20, 1895. Serial No. 546,459. (No model.)

*To all whom it may concern:*

Be it known that I, JOHN C. MCCARTHY, a citizen of the United States, residing at Fort Wayne, in the county of Allen, in the State of Indiana, have invented certain new and useful Improvements in Oil-Cans; and I do hereby declare that the following is a full, clear, and exact description of the invention, which will enable others skilled in the art to which it appertains to make and use the same, reference being had to the accompanying drawings, which form part of this specification.

My invention relates to improvements in locomotive oil-cans.

The object of my invention is to provide a cheap and convenient locomotive oil-can having its air-vent and delivery-pipe so arranged as to be normally closed by a spring-pressed lever, whereby the contents will not be splashed nor spilled by the motion of the engine, and so arranged that the lubricating-can may be safely filled with the same facility while the engine is in motion as when at rest.

Another object of my invention is to provide a can for household use which can be made of various sizes and adapted to contain either kerosene-oil or gasoline or burning fluid and normally keep the same in an air-tight condition as a security against evaporation or explosion from fire.

My invention consists of a can, preferably of cylindrical shape, having inlet and outlet orifices and provided with a diametrical spring-pressed rod loosely mounted in the top thereof, and carrying near its forward end a suitable valve for closing the outlet-orifice at the base of the delivery-tube, and having at its rear end suitable air-vents and a pivoted operating-lever.

Referring to the drawings, in which similar numerals indicate corresponding parts throughout the views, Figure 1 is a side elevation of my improvement with the lower portion cut away and the fixed top thereof in vertical section, showing the construction and arrangement of the spring-pressed rod controlling the air-vents and the discharge-pipe. Fig. 2 is a detail of the rear end of the said rod, showing its enlarged tubular extension having proper inlet and outlet air-vents and loosely mounted in a screw-threaded removable cap.

The oil-can body is preferably cylindrical in form, of any proper size and material, pref- erably of sheet metal, has a proper bail 18, provided with a handle 19, a handle 20 upon the rear side thereof, and a closed oval top 4 rigidly fixed upon said can-body, as shown in Fig. 1. The top 4 has a filling-orifice closed by a screw-threaded top 17, and also has two diametrically-opposite lateral circular perforations for the discharging-spout and the removable cap 5, respectively. The orifice for the cap 5 has an internally-screw-threaded sleeve 3 rigidly fixed therein, and is adapted to secure said cap 5 thereon. The said cap 5 has a circular closed top centrally perforated for the tubular extension 7 of the spring-pressed rod 29, and an externally-screw-threaded extension 6 to fit the sleeve 3 in Fig. 1. Externally to cap 5 is an operating-lever 8, attached at its fulcrum end to 7, and having a curved face, and is eccentrically loosely pivoted by a pivot 30 to 7, so that by depressing the outer arm of the lever the rod 29 with its tubular extension 7 will be drawn rearwardly, as hereinafter described. Upon the forward end of 7 is mounted, between the perforated collar 10 rigidly attached to 7 and the perforated collar or washer 21, a coiled spiral spring 9.

11 is a packing of any suitable material placed between 21 and the inner side of the cap 5 around the tube 7.

12 is the perforated annular metal valve-disk, loosely mounted upon the rod 29, with perforated leather or rubber packing mounted upon said disk 12 and secured in front of the valve by a pin through 29, as shown in Fig. 1.

15 is an annular collar or flange rigidly secured to 29, and 14 is a coiled spiral spring loosely mounted on 29, between the disk 12 and the collar 15, and sufficiently compressed to press the packing 13 of the valve closely against the base of the annular discharging-spout 2, as shown in Fig. 1, and thereby securely closing the outlet against any escape of the oil or any other fluid when the spring-pressed rod 29 is in its normal position; but said spring can readily be further compressed when it is desired to release the valve 12 as hereinafter described.

16 is an edge view of a centrally-perforated spider rigidly secured to the spout 2 and adapted for a bearing for the end of the rod 29, and the spout 2 being rigidly and tightly secured to the side wall of the top 4.

22 and 23 are vents in the tube 7 for the external admission of air in the tube, and 26 are vents for the admission of air into the interior of the cam, as hereinafter described.

25 is a head rigidly and tightly secured to the rear end of 7.

27 is a metal sleeve rigidly secured to the interior wall of 7, the collar 10, and the rod 29, for the purpose of strengthening the same.

29 is a metal rod having its rear end rigidly attached to the tubular extension and its forward end loosely mounted in the perforated spider 16, which serves as a guide and bearing for retaining it in proper position.

While the foregoing description embraces the two springs 9 and 14, it is obvious that either one of the springs can be dispensed with and still the invention can be efficiently used, and I therefore do not make the use of two springs essential.

The mode of operating the can is as follows: It is filled with oil or other fluid through the filling-orifice, which is then securely closed by the cap 17. The coiled springs 9 and 14, partially compressed between their respective collars, press the packing-surface 13 of the valve 12 firmly against the base of the interior protruding end of discharging-spout 2, hereby preventing any of the contents of the can from escaping. When in this position, the air-vents 22 and 23 are within the cap 5, so that neither the air from without can enter the tube nor the contents of the can escape through the same. In a word, the can is hermetically closed, and it can be inverted or held in any other position without any of the contents escaping.

When it is desired to discharge the oil or fluid, holding the can by the bail 20 and depressing the lever 8, the rod 29 is drawn rearward and the valve 12 is opened. By the same movement the vent 22 is brought in contact with the air externally of the cap 5 and the air, rushing into the tube 7 through the vent 22, escapes by the orifices 26 into the interior of the can, and by the atmospheric pressure the fluid is discharged at the spout 2. If it is desired to increase the discharge the lever 8 is depressed until the vent 23 is exterior to the cap 7 and additional air thereby admitted, thus increasing the flow. By means of the plural vents the volume of the discharge can be regulated at pleasure. Releasing the pressure upon the lever 8, the springs 9 and 14 close the discharge-valve and the can is securely sealed, so that no further escape of the contents is possible. It will thus be seen that the can is opened at pleasure by simply depressing the lever and is automatically closed by releasing the pressure.

The advantages are obvious. When closed it is secure from leakage or spilling when held in any position. If gasoline or burning fluid is used there can be no danger of explosion if coming in contact with flame, for when not in use it is always securely sealed by the automatic action of the spring-pressed rod.

Having thus described my invention, what I claim as new, and desire to secure by Letters Patent, is—

1. An oil can provided with a removable horizontal spring pressed rod 29, loosely mounted in the top thereof in line with the discharge opening and carrying near its forward end a rigid valve having a valve seat upon the inner end of the discharge spout for the purpose specified, and adapted for automatically closing the same, and having at its rear end suitable air vents as shown, and a pivoted operating lever 8, eccentrically fulcrumed as shown, and having a bearing upon the removable cap 5, and so arranged that the valve will be normally closed, when the pressure on said lever is removed, substantially as described.

2. In an oil can having a top 4 with proper inlet a proper discharging spout 2 rigidly and tightly secured in said top: a rod 29 mounted at its forward end in a spider 16 and provided with a suitable valve 12 for closing the discharging spout at its base, and said rod at its rear end having rigidly secured thereto a tubular extension 7 passing rearwardly through a perforated cap 5; and pivotally attached to said extension externally to said cap an operating lever 8, so arranged that by means of the connecting rod 29, the discharging valve can be released from the discharging spout and the contents of the can discharged through the outlet: also an extension of the cap 5 adapted to fit into the internally threaded sleeve 3: suitable packing around the tube 7 upon the inner side of the cap 5 to prevent the discharge of the contents of the can: the spirally coiled springs 9 and 14 mounted upon the rod 29 and adapted by their pressure to automatically close the discharge valve 12 when in its normal position: the tubular extension 7 having suitable air vents so arranged that when the discharging valve 12 is in its normal position and the filling inlet closed the can will be securely sealed;—and when the discharging valve is released from the contact with the discharging spout, air will be admitted through one or more of the air vents at pleasure, into the interior of the can all substantially arranged as shown and described for the purposes herein stated.

3. The combination with an oil can of the spring pressed rod 29 having a tubular extension 7, with air vents therein, and rigidly mounted on said rod 29 at its forward end, the valve 12 for closing the outlet of the discharging spout 2; at its rear end the eccentrically pivoted lever 8; said parts being arranged and operating substantially as described.

Signed by me at Fort Wayne, Allen county, State of Indiana, this 13th day of April, 1895.

JOHN C. McCARTHY.

Witnesses:
HENRY C. KRAMER,
EMMETT V. HARRIS.